July 4, 1950     W. A. GREENWOOD ET AL     2,513,723
LENS SYSTEM AND MOUNTING FOR TELEVISION PROJECTION
Filed June 22, 1948
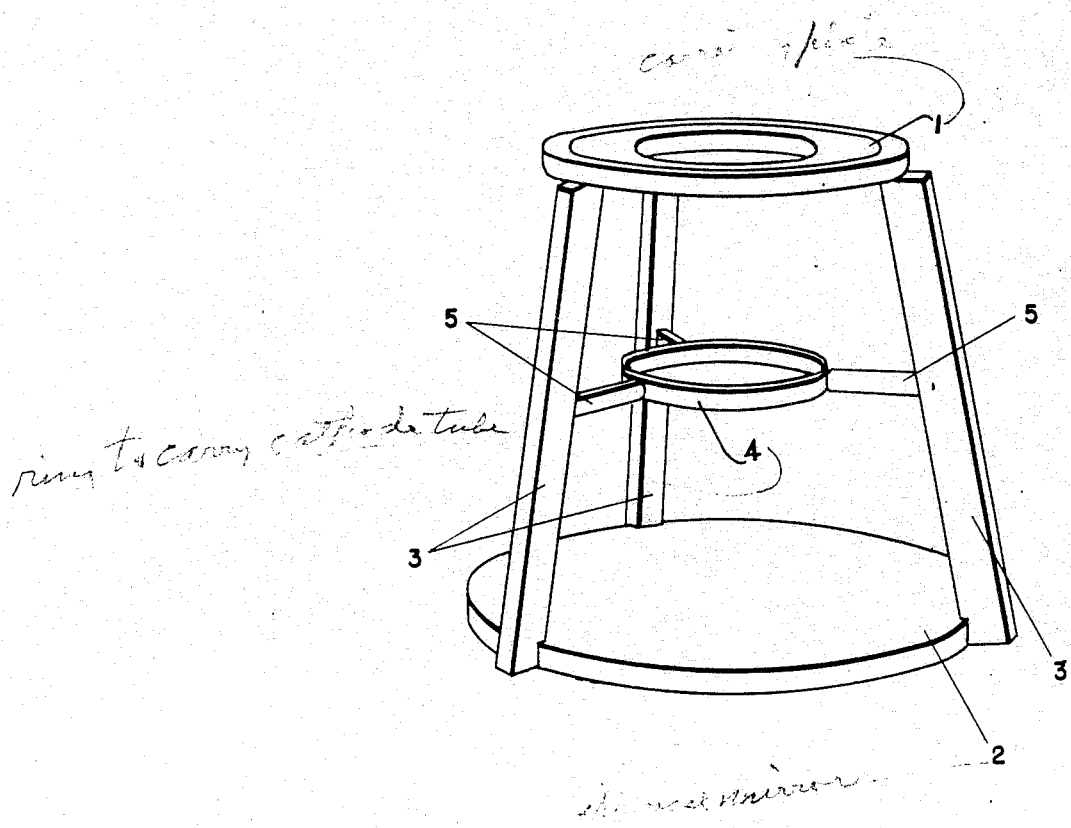
Inventors
WILLIAM ANTHONY GREENWOOD
WILLIAM LIDDELL
Cushman, Darby & Cushman
Attorneys Patented July 4, 1950

2,513,723

UNITED STATES PATENT OFFICE 2,513,723

LENS SYSTEM AND MOUNTING FOR TELEVISION PROJECTION

William Anthony Greenwood, Barnet, and William Liddell, West Kensington, London, England, assignors to Imperial Chemical Industries Limited, a corporation of Great Britain Application June 22, 1948, Serial No. 34,378
In Great Britain August 1, 1947

13 Claims. (Cl. 88—57)

This invention relates to new synthetic resin articles, particularly television projection systems.

Optical elements, e. g. lenses, mirrors, prisms, gratings and correcting plates, have been fabricated from transparent materials, such as glass and synthetic resins, and from materials having highly reflecting surfaces as an inherent property, e. g. various metals, or as a property imposed on them, e. g. glass or synthetic resins coated with a metal film. Synthetic resins are best suited to the production of aspherical and large optical elements because when they are used the costly grinding operations required for the production of these elements in other materials can be avoided to a large extent. Synthetic resins have also the advantages of lightness and impact strength over other materials used for optical elements.

Optical systems, i. e. systems comprising more than one optical element, have been produced by gripping optical elements in a mounting which holds them in correct alignment to, and distance from, one another. Mountings for optical systems have usually been fabricated from metal in order to ensure robustness and rigidity. These prior art mounts suffer, however, from the disadvantages that they have different coefficients of thermal expansion from the optical elements, particularly when these elements are of synthetic resin, and inaccuracies in optical systems are caused thereby, that the weight and bulk of the systems is to a large extent due to the need for reliable means for gripping the optical elements and that it is difficult to adjust this gripping so that it does not result in either strain in the optical elements or freedom of movement of the optical elements, this last disadvantage being particularly marked when the optical elements are fabricated from synthetic resin.

In the mounting of optical systems comprising at least one lens element of synthetic resin in a housing formed of a material having a substantially different coefficient of thermal expansion from that of the synthetic resin, it has been proposed to overcome the difficulties arising from differential thermal expansion by mounting the lens in a sleeve of a material having a coefficient of thermal expansion of the same order as that of said plastic, and mounting the sleeve in the metal housing in such a way that radial expansion and contraction of said sleeve are translated into axial movement of the latter relative to said housing. This method of mounting is not satisfactory in television projection systems comprising a cathode ray tube, a concave mirror and a corrector plate because the system mounted in this way is unnecessarily bulky and expensive and because this method of mounting is not suited for the easy insertion of the cathode ray tube in assembly or replacement.

The object of the present invention is to provide an improved television projection system comprising a concave mirror, a corrector plate and a means for centring the cathode ray tube face. A further object is to provide such an optical system in which the optical elements are mounted so that they are not free to move out of alignment with one another, the mounting in this system being by means which have substantially the same coefficient of thermal expansion as the optical elements. A still further object is to provide such a system in the mounting of which electrical conductors are to a large extent avoided and therefore which does not require special means for the insulation of the high electrical potentials necessary in the cathode ray tube. Another object is to provide such a system which is light and of particularly little bulk. Yet another object is to provide such a system which is particularly easily made from its components without the imposition of strain on the optical elements, and is form stable. A still further object is to provide such a system which may be constructed in such a manner that the means for centring the light source adds to the robustness of the system.

According to the present invention these objects are accomplished by an optical system for television projection comprising a concave mirror spaced from a corrector plate by struts, said concave mirror, corrector plate and struts being composed essentially of synthetic resin and being cemented together by a room temperature solvent for their contacting surfaces, and means positioned between said struts for centring a cathode ray tube face.

It will be appreciated that in the construction of the systems of this invention it is necessary for the contacting surfaces of the components of the system to be of thermoplastic synthetic resin in order that cementing by a solvent may be accomplished. Thus the struts spacing the mirror from the corrector plate must contact the mirror outside any metallised surface of the mirror. Also if the corrector plate has a hard surface of thermoset resin the surface areas of the corrector plate to be cemented to struts must be free from thermoset resin.

The means used for centring the cathode ray tube should be such that they engage the cathode ray tube face at a number of points, preferably at three points. For example, the said means may comprise a ring member joined to the said struts, for example by transverse struts which are cemented to the ring member and cemented at their other ends to the said struts spacing the corrector plate from the concave mirror. The said means may also comprise transverse struts spaced symmetrically round the cathode ray tube and connected to the longitudinal struts, which transverse struts themselves engage with the face of the cathode ray tube.

Where a ring member is used, this member may be suitably grooved to centre and support the cathode ray tube face. Thus in a preferred system, designed for supporting the cathode ray tube in a vertical position, the ring member is grooved in such a manner that the cathode ray tube face fits into the groove, and the supporting flange is cut away so that the cathode ray tube face rests on projections (which are preferably three in number) from the ring member, symmetrically placed around the inner perimeter of the ring. In this way the cathode ray tube is firmly supported and loss of light to be projected onto the viewing screen is reduced to a minimum. The projections may if desired each carry a screw, for example of polythene, by means of which the alignment of the cathode ray tube face may be adjusted.

When the transverse struts themselves engage with the cathode ray tube face, these struts are preferably three in number, and these struts also may if desired be fitted with screws by which the alignment of the cathode ray tube may be adjusted.

It is preferred that, where optical elements of large diameter are included in the system, the frame work contains at least three struts for spacing the corrector plate from the mirror. The struts, and ring member if used, are preferably in a strainfree condition before assembly. Where further optical elements, in addition to the concave mirror, cathode ray tube face and corrector plate, are required in the system they may be cemented directly to the longitudinal struts or supported by ring members, of the type which may be used for locating the cathode ray tube, cemented to these struts either directly or through transverse struts. Transverse struts joining any ring member of the framework to the longitudinal struts may either be cemented to the ring member or be formed integrally therewith. The former arrangement is generally preferred in view of the greater ease of manufacture of the separate components. The struts, and ring member or members if used, are preferably provided with a substantially non-reflecting surface, for example by painting them with a matt black paint.

The preferred thermoplastic synthetic resins used in the optical elements or framework of the optical systems of the present invention are rigid resins prepared from one or more liquid compounds containing one $CH_2=C<$ group per molecule, for example, esters of methacylic acid such as methyl methacrylate, cyclohexyl methacrylate, and 2,2,2-trifluoroethyl methacrylate, vinyl acetate and styrene. Accurate optical elements may be produced easily from these materials, and the materials are easily cemented together. For ease of production of the optical elements and for good optical qualities, polymethyl methacrylate is particularly preferred. Other suitable resins include polymers and interpolymers of vinyl chloride and vinylidene chloride.

It is preferred that when the optical elements of the systems are fabricated from the same synthetic resin the framework is also fabricated from this resin so that the coefficient of thermal expansion of the optical elements is identical with that of the framework.

For ease of constructing the framework components, and of obtaining them in a strain-free condition, these components are preferably flat strips or rings which have been machined from sheets of the synthetic resin. These sheets are most easily obtained by casting, when they may be obtained in a substantially strain-free condition, but they may be produced by other methods, for example, by moulding, provided that the strains so introduced are released (for example, by the method described in British Patent No. 580,855). When the strips are required to be cut to an accurate length, any strains in the sheet should be removed by annealing before the strips are cut.

The optical elements and framework may be cemented together by moistening the surfaces to be jointed with a liquid which is a solvent for the thermoplastic synthetic resin or resins at room temperature, and holding the joint in position until the solvent has dispersed. It is preferred that the solvent contain a dissolved thermoplastic synthetic resin. When these solutions are used it is not necessary for the contacting surfaces of the optical elements and the framework to fit perfectly since gaps in the joints or irregularities in the said surfaces will be filled by the polymeric material. The strongest joints are obtained by this method when the synthetic resin in the solution is of the same type as the resin of the optical element and framework.

The optical elements and framework may be advantageously cemented together by using a solvent for the thermoplastic synthetic resin or resins at room temperature which is a polymerisable liquid, the surfaces to be joined being coated with this liquid, and the joint then being held in position until the liquid has polymerised to a rigid solid. Particularly strong joints are obtained in this way. The polymerisable liquid may be polymerised by light activation, for example, by the process described in British Patent No. 567,776, in which case it should contain a photopolymerisation catalyst such as benzoin or diactyl, or by heat activation, in which case the liquid preferably contains a heat polymerisation catalyst such as benzoyl peroxide. The polymerisation must however be conducted at a temperature below the softening temperature of the synthetic resin of the optical elements and framework, and is preferably carried out at a temperature not greater than 90° C. The polymerisable liquid may comprise a monomeric compound containing ethylenic unsaturation or a mixture of such compounds when it is applied to the optical elements and mounting, but is preferably a syrup which has been prepared by dissolving in the monomer or monomers in the unpolymerised or partially polymerised state a solid polymer prepared by polymerisation of the monomer or monomers, or by partially polymerising the monomer or monomers until a syrup is obtained. If the cement is formed by dissolving polymeric material in the monomer or monomers, it may contain so much of the polymeric material that a dough is formed, and the joints may be formed by means of this dough, for example by the method described in British Patent No. 565,801, that is, by interposing the dough between the surfaces to be joined and polymerising the polymerisable constituents of the dough by heat or light activation while the components to be joined are maintained in the desired position.

When the optical elements and framework are cemented together by a polymerisable cement, it is preferred that the optical elements, framework and cement are all derived from the same polymerisable material or materials.

An example of a television system of the present invention is represented by the drawing attached to this specification. In this drawing, 1 is a Schmidt type correcting plate, drilled centrally for the barrel of a cathode ray tube, 2 is a spherical concave mirror metallised on its concave surface and 3 are three strips of thermoplastic material cut accurately for spacing the correcting plate from the mirror. 4 is a ring of thermoplastic material suitably grooved to carry the cathode ray tube and spaced accurately by three thermoplastic strips, 5, which are cemented to the ring and to the struts 3, to centre the cathode ray tube face in the desired position. The correcting plate and the mirror are also composed of thermoplastic material, the struts 3 being joined to non-metallised surface areas of the mirror. The components are joined together by a polymerisable or non-polymerisable cement which is at room temperature a solvent for the thermoplastic resin or resins used. The assembly is most conveniently mounted in a cabinet by screwing the edges of the corrector plate symmetrically to the lower surface of a suitably cut shelf. The cathode ray tube may conveniently be held in position by means of at least three springs fixed in such a way that their resultant force is substantially along the axis of the cathode ray tube.

The television systems of this invention may if desired be enclosed in dust-impermeable bags, for example bags of plasticised polyvinyl chloride sheet.

By reason of the simplicity of construction of the television systems of this invention, the optical elements are easily placed in position and the cathode ray tube and any other elements mounted in grooved rings or like locating means may easily be replaced without disturbance to the rest of the system. For example in the television projection system shown in the drawing attached to this specification the cathode ray tube may be readily positioned during the construction of the system, and may easily be removed from the finished system for repair or replacement without disturbance of either the aspheric corrector plate or the concave mirror. Moreover, systems according to this invention may be designed to include a series of optical elements of differing diameter. The optical systems are of extremely light weight but are nevertheless strong and rigid and do not distort under their own weight, and the optical elements cannot be shifted out of alignment with each other. An additional advantage is that the frameworks are not conductors of electricity and are therefore free from the danger of leakages of the high voltages associated with the cathode ray tubes.

Our invention is illustrated but in no way limited by the following examples.

*Example 1*

A television projection optical system was produced from a polymethyl methacrylate Schmidt type correcting plate 5.5 inches in diameter, drilled centrally for the passage of the barrel of a cathode ray tube, a spherical concave mirror of polymethyl methacrylate coated with a film of aluminium on its concave surface and 8 inches in diameter, three strips of polymethyl methacrylate of 1 x ½ x 7.3 inches for spacing the plate from the mirror and cut to accurate length ($\pm 5/1000$ inch), a ring of polymethyl methacrylate grooved to carry a 2.5 inch diameter cathode ray tube face, and three ½ x ¼ x 3 inch strips of polymethyl methacrylate for spacing said ring from the longer strips, said ring and strips being cut from a ½" thick strain-free polymethyl methacrylate sheet. These strips and ring were cemented together by means of films of 10% by weight polymethyl methacrylate dissolved in chloroform, to form a tripod framework having a grooved ring held between its three legs, this ring being accurately spaced from the mirror and the short strips being jointed to the ring and to the long strips by butt joints. These strips and the ring were held in a jig for 2 hours during which time the joints became strong. The legs of this tripod were were placed on three pools of a solution of 10% by weight polymethyl methacrylate dissolved in chloroform, these pools being on a flat, machined edge of the mirror just outside the metallised part of its surface. The tripod was pressed into the pools so that only a thin film of solution remained between it and the mirror. After one hour the tripod was jointed firmly to the mirror and the assembly obtained was placed in a jig adapted also to carry the correcting plate at the end of the tripod further from the mirror.

A point source of light was placed at the intended optical centre of the cathode ray tube and a screen was placed to receive the light focussed by the completed system. The ends of the tripod which were to carry the correcting plate were moistened with a 10% by weight solution of polymethyl methacrylate in chloroform and the correcting plate pressed against these ends and moved until optical centring of the plate was indicated by the light falling on the screen. After one hour the plate was jointed firmly to the tripod and the optical system could be removed from the jig.

The optical system obtained was strong and compact and did not distort under its own weight however mounted. A cathode ray tube could be inserted into it through the tripod mounting and the hole for this tube in the correcting plate was therefore of minimum size. Furthermore the optical elements of the system could not be shifted out of alignment with one another.

*Example 2*

A television projection optical system was produced as in Example 1, except that the components were heated to a temperature of 70° C. before the cement was applied, and the cement used was a syrup produced by partial polymerisation of methyl methacrylate, this syrup having a polymer content of 32% by weight and a viscosity of 13 poises at 20° C. The cement contained 2% by weight of benzoyl peroxide and was hardened by placing the assembled system, held in a suitable jig, for one hour in an oven maintained at a temperature of 70° C., for each cementing step. The joints obtained in this way were as strong as the polymethyl methacrylate spars themselves, and by repeated testing of this method it was found that the critical dimension, that is, the distance between the cathode ray tube locating ring and the mirror, could be guaranteed to ∓5/1000 inch.

We claim:

1. An optical system for television projection comprising a concave mirror operatively spaced from a corrector plate by spacing struts, a ring member for centering the cathode ray tube face fixedly positioned between said spacing struts and connected thereto by transverse struts connected to and disposed substantially transversely of said spacing struts and between the said concave mirror and said corrector plate, said concave mirror, corrector plate, struts and ring member being composed essentially of synthetic resin and being cemented together by means of a solvent at room temperature applied at their contacting surfaces.

2. An optical system according to claim 1, in which said ring is grooved to centre and support said cathode ray tube face.

3. An optical system according to claim 1, in which at least three spacing struts are used to space said concave mirror from said corrector plate.

4. An optical system according to claim 1, in which said spacing struts, transverse struts and ring member have substantially non-reflecting surfaces.

5. An optical system according to claim 1, in which said concave mirror corrector plate, spacing struts, transverse struts and ring member are composed of the same thermoplastic synthetic resin.

6. An optical system according to claim 1, in which said spacing struts, transverse struts, and ring member have been cut from flat, strain-free sheets of thermoplastic synthetic resin.

7. An optical system according to claim 6, in which the synthetic resin of said concave mirror, corrector plate, spacing struts, transverse struts, and ring member is polymethyl methacrylate.

8. An optical system according to claim 1, in which said concave mirror, corrector plate, spacing struts, transverse struts, and ring member have been cemented together by means of a room temperature solvent for their contacting surfaces, which solvent contains a dissolved thermoplastic synthetic resin.

9. An optical system according to claim 1, in which said solvent is a polymerizable liquid.

10. An optical system according to claim 9, in which said polymerizable liquid is a syrup prepared by partial polymerization of a compound containing ethylenic unsaturation.

11. An optical system according to claim 10, in which said cement material has been polymerized at a temperature not greater than 90° C.

12. An optical system according to claim 1, in which said concave mirror, corrector plate, struts, ring member, and cement have been derived from the same polymerizable compound.

13. An optical system according to claim 1, in which means on said ring member engages the cathode ray tube face at three spaced points.

WILLIAM ANTHONY GREENWOOD.
WILLIAM LIDDELL.

REFERENCES CITED

The following references are of record in the file of this patent:

UNITED STATES PATENTS

| Number | Name | Date |
|---|---|---|
| 56,178 | Chase | July 10, 1866 |
| 2,212,123 | Neil et al. | Aug. 20, 1940 |
| 2,273,801 | Landis | Feb. 17, 1942 |
| 2,295,779 | Epstein | Sept. 15, 1942 |
| 2,314,838 | Kingston | Mar. 23, 1943 |
| 2,423,491 | Fairbank | July 8, 1947 |
| 2,424,513 | Stephan | July 22, 1947 |

FOREIGN PATENTS

| Number | Country | Date |
|---|---|---|
| 490,381 | Great Britain | Aug. 15, 1938 |